United States Patent [19]

Gutsche

[11] Patent Number: 4,846,549

[45] Date of Patent: Jul. 11, 1989

[54] METHOD AND APPARATUS TO PRODUCE ENHANCED LUMINOSITY ON DISPLAY DEVICES IN GLARE

[76] Inventor: Gunter E. Gutsche, 4476 Forget, Terrebonne, Quebec J6X 1Z4, Canada

[21] Appl. No.: 75,606

[22] Filed: Jul. 20, 1987

Related U.S. Application Data

[63] Continuation-in-part of Ser. No. 657,886, Oct. 5, 1984, abandoned.

[51] Int. Cl.[4] .......................... G09F 13/04; G02B 5/00

[52] U.S. Cl. ...................................... 350/101; 40/561; 40/562

[58] Field of Search .................... 40/561, 562; 350/97, 350/100, 101, 276 R, 278, 279, 280

[56] References Cited

U.S. PATENT DOCUMENTS 601,577 3/1898 Manning .............................. 40/561
1,249,795 12/1917 McGrath .............................. 350/100
1,726,944 9/1929 Bridgman .
1,764,639 6/1930 Nathansohn .......................... 40/561
2,017,617 10/1935 Guistin ................................ 40/561
2,191,558 2/1940 Cooley ............................... 350/100
2,426,163 8/1947 Booth ................................ 350/100
3,861,379 1/1975 Anderson, Jr. ...................... 126/438
4,211,212 7/1980 Braun ................................ 126/440
4,316,652 2/1982 Auer, Jr. et al. ............... 350/276 R
4,403,755 0/0000 Gutsche .

FOREIGN PATENT DOCUMENTS 483257 9/1929 Fed. Rep. of Germany .
661424 7/1929 France .
346903 4/1931 United Kingdom .

*Primary Examiner*—Bruce Y. Arnold

[57] ABSTRACT

A display device and method are provided whereby light rays from a glareproducing light source are concentrated on the signal portion of the display device to enhance its luminosity. Display devices are provided that use reflecting and refracting light concentrators and signal portions that might include translucent light directing means or collimators. The invented display devices can find application in various fields where glare occurs.

23 Claims, 5 Drawing Sheets

METHOD AND APPARATUS TO PRODUCE ENHANCED LUMINOSITY ON DISPLAY DEVICES IN GLARE

This is a continuation-in-part application of patent application Ser. No. 657,886 filed 10/05/85 now abandoned.

BACKGROUND OF THE INVENTION

1. Field of the Invention

The present invention relates to display and signal devices and more particularly to display devices with increased luminosity in glare conditions.

Many display devices such as outdoor advertisements, highway signs, obstacle markers, vehicle markers, vehicle instruments and the like must often be read with the observer facing an intense light source such as the sun or oncoming headlights. In these situations the intense light source causes the eyes of the observer to react by narrowing the pupils and initiating protective chemical changes that diminish the capacity of the observer to read and understand any signal close to the incoming light rays. This is the case for example for highway signs on roadways leading in a easterly or westerly direction and travelled in the morning and evening during the winter months. A notorious case is recognized to be the beltway of the Dallas-Fort Worth area where misreading of a single letter can cause long detours for a first-time traveller. In more serious situations where a stop sign or an obstacle is overlooked or an instrument is misread when an observer is unable to see them because they are nearly invisible in contrast with the nearby glare, grave consequences can result. It is the purpose of the present invention to remedy these situations and provide display devices whose signal portion will automatically increase in luminosity when these display devices are viewed in the same field of vision with a glare producing light source.

2. Description of the Prior Art

One way to convey certain messages under glare conditions is to provide highway signs with standardized and distinct silhouettes such as the octogonal stop sign or the triangular yield sign. While such display devices can be discerned by their outline against a glaring light source, the number of messages is limited to a few simple indications. Another way of dealing with the effects of the low sun in traffic signs is shown in U.S. Pat. No. 4,316,652 to Auer. However this traffic signal deals with the effect of the glaring sun when it is behind the observer, whereas the present invention deals with the glare produced when the observer faces a light source head-on. A number of U.S. and foreign patents teach the use of redirected light coming substantially from the overhead sky to illuminate display devices viewed horizontally. By contrast the present invention addresses itself to the problem of display devices viewed on the line of sight with the illuminating light source. The U.S. Pat. No. 2,017,617 to Guistin is cited as an example of how to improve an illuminated display device using the method and apparatus disclosed in this invention. The Guistin street sign differs from the present invention in at least 4 important aspects: (1) it is expressly designed to function not in glare conditions but in an environment lacking sufficient illumination; (2) accordingly it lacks a light concentrator to focus sufficient light onto its name plate, in effect it diffuses light in most directions; (3) to favor visibility in dim lighting conditions the Guistin device uses a large bright background surface with dark lettering, whereas the present invention working in conditions of glaring light requires a bright signal portion disposed on a darker background surface; (4) the cited invention does not show the alignment procedure between the moving light source and the observer crucial to enhance the luminosity of the signal portion to overcome glare conditions.

None of the prior art display devices seem to have the brightness enhancing means to make them especially visible alongside an intense light source.

SUMMARY OF THE INVENTION

It is therefore a principal object of the present invention to overcome the aforementioned disadvantages discussed with respect to the prior art devices.

It is a further object of the present invention to provide display devices that automatically increase the luminosity of their signal portion when they are viewed together with an intense light source.

It is a further object of the present invention to provide traffic signal, obstacle markers, vehicle markers and illuminated instruments that reduce the hazards resulting from operators failing to see them in glare conditions.

It is a further object of the present invention to provide display devices that increase their brightness and visibility without relying on an artificial power supply.

It is a further object of the present invention to provide elements or components that can be retrofitted on display devices in order to give them enhanced luminosity in glare conditions.

Numerous further objects will become apparent from the description hereinafter.

In one aspect of the present invention there is provided a method to automatically increase the luminosity of the signal portion of a display device when it is viewed from a locus defined by light rays that have by-passed the display device, said display device having a light concentrator and light directing means adapted to direct some of these light rays toward said locus, the method comprising the steps of determining the positions of the light rays, display device and locus where the display device and light rays are in the same field of vision, aligning the display device to face its light concentrator into said light rays and its signal portion toward the locus and exposing the display device to the light rays to concentrate the light rays onto the signal portion to enhance its luminosity. The method can be carried out by reflection or refraction of the light rays. The method can be carried out with a translucent member of the signal portion that gives selected color and direction to some of the concentrated light rays. The method can include the step of individually adjusting the light concentrators and directing the light rays at a selected angle to the display device. The method can employ a display device having tracking means and include the step of tracking the light rays as they are concentrated on the signal portion. The method can provide for the use of a collimating reflector or a collimating refractor to deliver some of the light rays substantially parallel to the observer. The method provides for the use of light conductors such as optical fibers to by-pass opaque obstacles. The method shows the use of oscillating parts of the display device to vary the brightness of the signal portion to attract greater attention.

In a further aspect of the invention there is provided a display device with a bright signal portion subject to be viewed together with light rays that, when by-passing the display device, define a locus from where glare is apparent, the improvement in the display device consisting of: brightness enhancing means comprising a light concentrator aligned to face toward said light rays and adapted to converge said light rays toward said signal portion and light directing means adapted to pass some of said light rays on toward said locus.

In further aspects of the invention the light concentrator comprises a reflector and/or a refractor.

In a further aspect of the invention the signal portion comprises a transluscent member of selected optical properties.

In further aspects of the invention the light concentrator is adjustable or pivotable and may comprise tracking means to adjust automatically to the direction of the light rays.

In a further aspect of the invention there is provided a display device that has on it several light concentrators facing different directions and more than one signal portion facing an extended locus in order to enhance the luminosity of the display device when light rays by-pass it from different directions.

In further aspects of the invention there are provided display devices with collimating refractors or reflectors to project parallel light rays toward the locus of observation.

In a further aspect of the invention there is provided a display device with light conducting means such as optic fibers to transmit light rays between the light concentrator and signal portion past opaque obstacles.

In a further aspect of the invention there is provided oscillating means on the display device adapted to cause the fluctuation of the luminosity of the signal portion to make it more noticeable.

In a further aspect of the invention there is provided a member or component to retrofit prior art display devices with a means to enhance the luminosity of their signal portions.

BRIEF DESCRIPTION OF THE DRAWINGS

The invention is illustrated by way of example in the accompanying drawings wherein.

DESCRIPTION OF PREFERRED EMBODIMENTS

Referring now in detail to the drawings.

Figure 1:
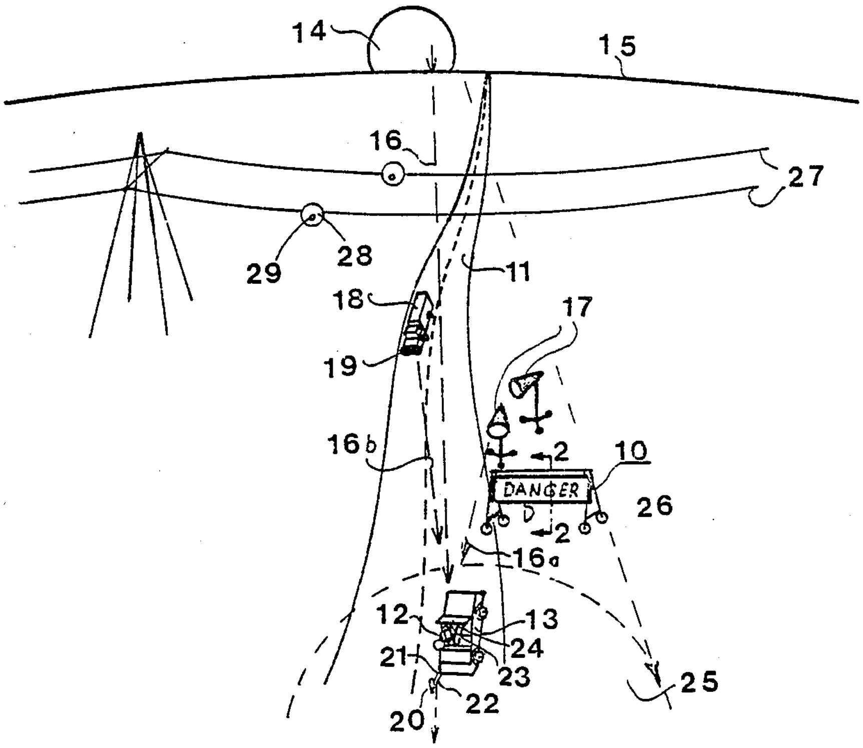
FIG. 1 is a perspective view of four display devices subjected to glare-producing light rays.

FIG. 1 illustrates in perspective view four situations where the present invention can be advantageously employed. The display device 10 is a temporary highway warning sign. On roadway 11 is observer 12 in vehicle 13. The intense and moving light source 14 is the sun near the horizon 15. Light rays 16 are drawn in phantom lines as they travel in the direction from the sun 14. Further light sources 17 are recognized as lamps to illuminate a work site behind sign 10 near roadway 11. Further light rays **16*a* are given off by lamps 17 toward driver 12. An oncoming vehicle 18 with headlights 19 is a further light source shining further light rays 16*b* toward observer or driver 12. Vehicle 13 has a rear mounted display device 20 that is a vehicle marker incorporated in an antenna. Display device 20 intercepts some of the light rays 16,16*a* and 16*b* at its leading edge 21 that comprises light concentrators and emits some of these light rays from its trailing edge 22 that has an enhanced luminosity visible to any further observer behind vehicle 13 on roadway 11. Vehicle 13 has a further display device 23 that is mounted on the dashboard and is part of the cars instrumentation and shown in detail in FIG. 8. Display device 23 derives enhanced illumination from light rays 16,16*a* or 16*b* that have been received by light concentrator 24 that is part of display device 23 but remotely located in the rearview mirror assembly. The observer 12 is located in an area or space that is a locus of observation 25 that is defined by the light rays 16,16*a* or 16*b* that have by-passed or are anticipated to by-pass the proximity 26 of display device 10. It is within this locus 2 that significant glare is experienced from light sources 14,17 and 19. This locus extends on roadway 11 away from display device 10 to the limits of visibility. Similarly the locus associated with display device 20 extends towards the rear of vehicle 13. The locus for display device or instrument 23 encompasses the position of any drivers head. From the locus 25 the display device 10 and the light rays 16,16*a* and 16*b* are in the same field of vision. As field of vision shall be understood to be the range of vision an observer experiences without moving the head. A further display device is obstacle marker 28 suspended on power lines 27. This display device resembles the spherical markers used to warn aircraft and ships of these dangerous obstacles, but has been adapted in accordance with the present invention to intercept some of rays 16 and concentrate them on a bright signal portion 29 that has enhanced luminosity. Display device 28 may have several brightness enhancement means facing in different directions. Accordingly the locus associated with display device 28 may be the entire space around it defined by light rays that come from the overhead sun toward a climbing helicopter, light rays that come in the direction from a reflective surface such as water in a river toward a descending helicopter or light rays that by-pass the display device 28** at an oblique angle toward an aircraft approaching horizontally.

In FIG. 1 is well illustrated the steps of the disclosed method. The first step is to determine the position of the light source 14 or any further light sources, of the display device 10 and of locus 25 where the light rays 16 or further light rays are in the same field of vision. This can be done by reference to astronomical tables giving the position of the sun for various locations and times. Using accurate maps one can then establish at what locations the locus associated with display device 10 will coincide with the roadway. Alternatively the locus 25 can be discovered by empirical means that is by direct observation as the sun is observed in its glare producing positions.

Figure 2:
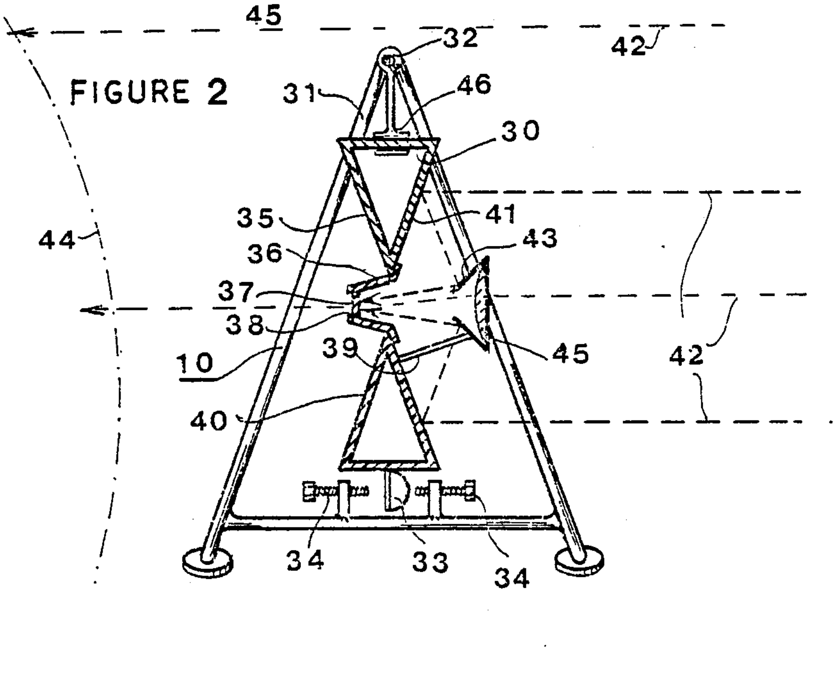
FIG. 2 is a sectional view of a display device.

The second step of the disclosed method entails positioning the display device 10 with its light concentrator that will be shown in FIG. 2 into the direction of the light rays 16 and its signal portion also shown in detail in FIG. 2 toward the locus 25. This can be done with display device 10 by moving it about until maximum luminosity is obtained as seen from locus 25. At times when the sun 14 is not in its glare-producing position, display device 10 can be positioned in anticipation of the angle at which glare will result in locus 25.

The third step of the disclosed method generates the required enhanced luminosity on display device 10 by exposing it to the light rays 16 thereby concentrating them on the signal portion or letters "DANGER" as seen from locus 25.

Similar procedures are evident for display devices 20, 23 and 28. The apparent movement of light sources 14,17 and 19 can be anticipated and predicted and the position of the loci associated with the various display devices are determined by their use or movement. It is understood from the examination of FIG. 1 that the locus of display device 20 for example is not a section of space fixed on the earth surface, but is a section of space defined solely in relation to the vehicle 13. The display device 20 is aligned on vehicle 13 in such a manner that it has enhanced luminosity toward the rear where other vehicles are bound to follow. It is anticipated that this will occur part of the time when such other vehicles and vehicle 13 face light rays in conditions of glare. During these times vehicle marker 20 will shine brightly.

In FIG. 2 is shown display device 10 sectioned along plane 2—2 and having element 30 suspended from support frame 31 by movable attachment means or hinge 32, about which it can swing as a pendulum. This swinging motion is induced by the aerodynamic forces that normally cause oscillations when wind passes an irregular object such as component 30. This swinging action is further aided by force transmitting means or vane 33 that is set at an angle to device 10 and transmits impulses of forces from wind gusts and turbulance from passing traffic to component 30. The darker background surface 35 carries brighter signal portion 36 that has light directing means 37 that is a cover made from a transluscent material disposed in opening 38. Strut 39 connects the light concentrator 40 with secondary reflector 43. The reflective surface 41 converges some of light rays 42 toward transluscent cover 37 and onto locus 44. This section of space 44 is defined by those of rays 42 that are anticipated to by-pass the proximity 45 of display device 10. It is in this locus of observation 44 that glare condition will be generated by light rays 42. Other light rays 42 that strike display device 10 are intercepted by light concentrator 46 which is a refractor or lens that converges them toward signal portion 36. The transluscent cover 37 has selected optical properties designed to impart a chosen color to the light rays 42 passing through them. It is disposed substantially at the focal area of reflectors 41,43 and refractor 45. A fluorescent material could be advantageously used in the composition of this light directing means 37. Light rays 42 that have been modified by transluscent member 37 are directed toward locus 44. The member or component 30 can be adjusted in a selected angle with respect to display device 10 by means of set bolts 34, that also serve to limit the range of the oscillation or swing of member 10 about hinges 32. Movable connecting member 32, force transmitting means or vane 33 and setting bolts 34 constitute the oscillating means of display device 10. The periodic movement of member 10 with respect to the support frame 31 and therefore with the direction of light rays 42 will cause the luminosity of signal portion 36 to fluctuate, attracting greater attention. An alternative way to achieve this effect would be to change the alignment within the brightness enhancing means of display device 10 which consists of light concentrators 40,46 and light directing means 37. A slideable bearing 46 is the adjustment means to incline the member 30 substantially normal to the direction of the light rays 42. It does this by shifting the center of gravity of component 30 with respect to hinge 32 and set bolts 34. The impact of member 30 with set bolts 34 creates percussions that serve to dislodge snow or debris that accumulate on display device 10.

Figure 3:
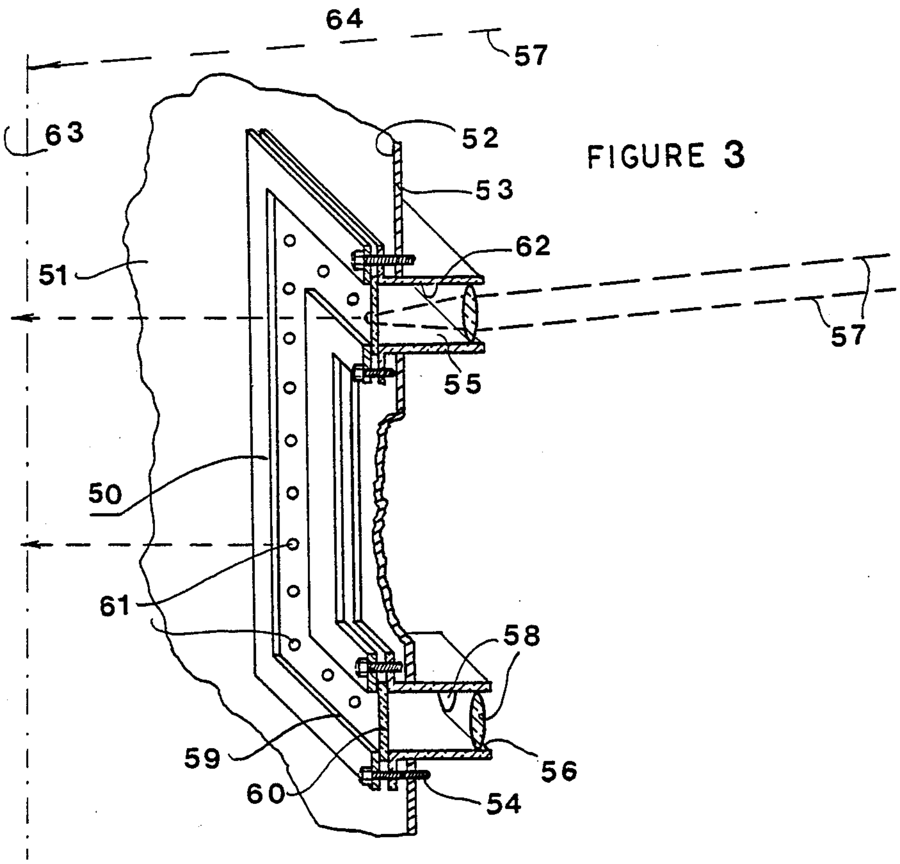
FIG. 3 is a sectional view of a display device.

In FIG. 3 is illustrated a section of letter 50 which is a member or component for use on display device 51 that has background surface 52 that is darker than letter 50. Through plate 53 are driven bolts 54 which are the attachment means and adjustment means to hold member 50 in selected alignment with display device 51. Cavity 55 has rear opening 56 in which are disposed light concentrator 58 that are refractors or lenses that converge some of light rays 57 toward signal portion 59 which is located substantially at focal length from lenses 58. Signal portion 59 comprises light directing means 60 which is a transluscent cover passing some of light rays 57 that are focused in bright spots 61 toward locus 63. This is the section of space where glare from light rays 57 will occur. Locus of observation 63 is defined by those of light rays 57 that are anticipated to by-pass the proximity 64 of display device 51. Cavity 55 may have reflective surface 62. This reflector in conjunction with light concentrator 58 will allow some of light rays 57 to be converged toward signal portion 59 from a wider angle. Element 50 can be retrofitted on existing display devices by cutting out the original letters and attaching component 50 by driving screws 54 into the existing display device. The use of a transluscent member 60 as light directing means has proven to be advantageous to make the bright spots 61 of enhanced luminosity more visible from all parts of locus 63. Internal reflection of light rays 57 within the transluscent material has also the effect of equalizing the areas of different brightness that are the result of unevenness in the light concentrators. These advantages of the action of a transluscent light directing means outweigh the loss of luminosity due to the uncontrolled scattering of some of the light rays converging toward it.

Figure 4:
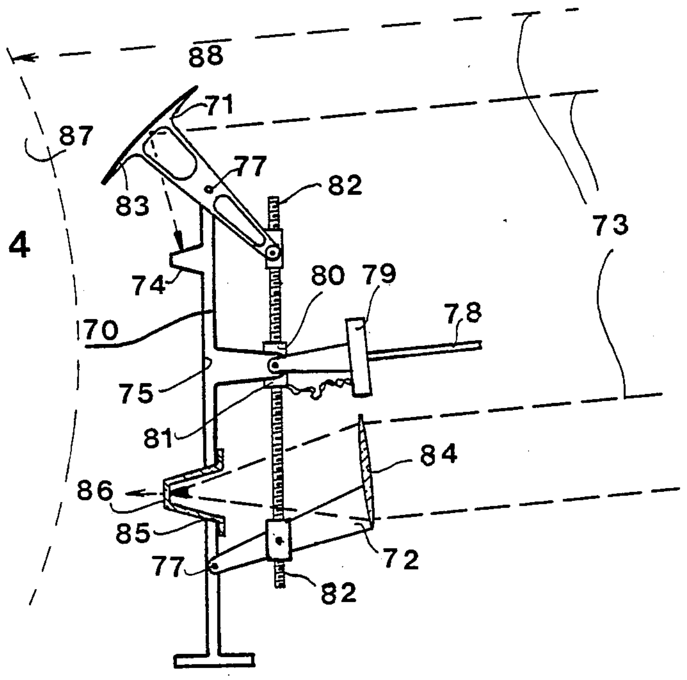
FIG. 4 is a schematic view of a display device.

In FIG. 4 is shown a schematic illustration of display device 70 that uses tracking means to align reflector 71 and refractor assembly 72 with the direction of light rays 73. The light concentrators 83 and 84 are a parabolic reflector and lens respectively and are pivotable about bearings 77. The tracking means is made up of the sensing means 78 that measures the angle of incidence of the incoming light rays 73 and computer 79 that generates electrical impulses for the sensing means to deliver to drive means or motors 80 and 81 respectively that are adapted by screw jacks 82 to move light concentrators 83 and 84 into positions where they converge some of light rays 73 toward signal portions 74 and 85 respectively. Signal portion 85 comprises a transluscent cover 86 that is the light directing means that transmits some of light rays 73 toward locus 87. Locus 87 is defined by the light rays 73 that have by-passed or are expected to by-pass proximity 88 of display device 70. Although the tracking means shown in this illustration use an electromechanical principle, the disclosed method can be also carried out by tracking means using the expansion of various materials when exposed or shaded from the sun. In this arrangement the tracking means would be working by moving the pivotable light concentrators by mechanical impulses. The electric power for the tracking means of display device 70 can be supplied if necessary by a photovoltaic array not shown. The various steps of the disclosed method are carried out automatically by the use of the tracking means. Accordingly the display device 70 need not be as accurately aligned with the direction of light rays 73 at the time of installation.

Figure 5:
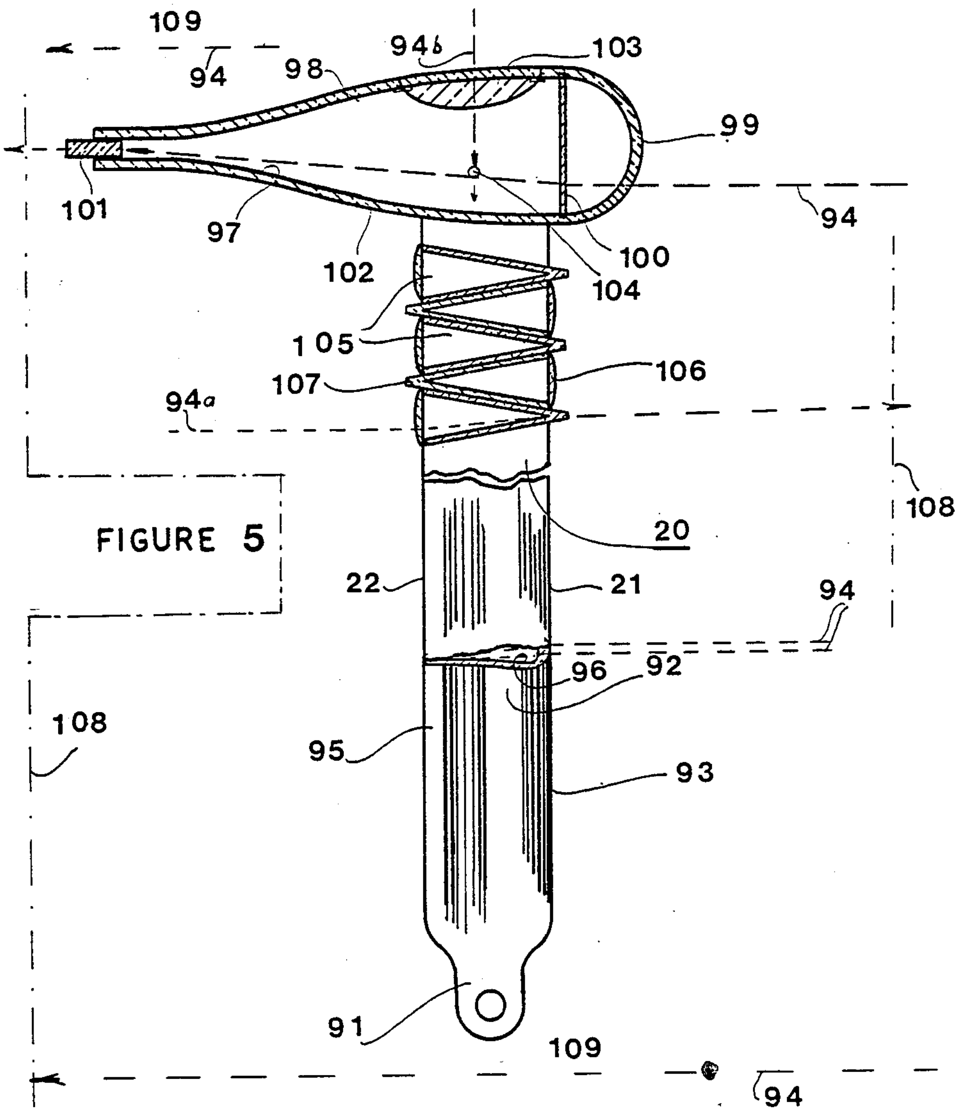
FIG. 5 is a partial sectional view of a vehicle marker.

In FIG. 5 is illustrated display device or vehicle marker 20. It has leading edge 21 and trailing edge 22. The vehicle marker 20 is adapted by flange 91 to be fixed to a vehicle like the car 13 in FIG. 1. The lower portion of display device 20 is a flexible rod 92 bent from a strip of transparent material such as "LEXAN" (r) of the General Electric Corp. A reflective coating 96 is applied inside rod 92. The transparency 93 and reflector 96 are the light concentrator that converges light rays 94 toward signal portion 95 that gives enhanced luminosity to the trailing edge. A section of the upper portion of display device 20 is an assembly of members or components 105 shown in sectional view. Each member or component 106 has a light concentrator 106 and signal portion 107 that is made of a light directing transluscent material. The components 105 may be cemented together by a suitable solvent in the reverse order shown. In this arrangement light rays 94a are seen to be converged by one of the members 105 toward leading edge 21 to increase the luminosity of vehicle marker 20 there. A streamlined marking element 98 tops vehicle marker 20. Its transparent cover 99 shields Fresnel lens 100 that converges some of light rays 94 toward light directing means 101. This is a transluscent plug held at a focal length from light concentrator 100. A part of transluscent sides 102 may have optional reflective coating 97 to direct some of light rays 94 into signal portion 101 by reflection. A further light concentrator 103 or lens is disposed on element 98 to converge light rays **94*b* toward bright spot 104. Light concentrators 93,100,103 and 106 and the light directing means made of transluscent materials in signal portions 95, 101 and 107 make up the brightness enhancing means of marker 20. As is apparent from the arrangement of light concentrators 93,106, and 103, enhanced luminosity can be gained on vehicle marker 20 against glare from light rays 94, 94*a* and 94*b* and others coming from further directions. This is advantageous for vehicles that can be approached from various angles that coincide with the direction of a strong light source. Such vehicle markers will be particularly useful on human powered vehicles where it is costly to provide powered lights. The locus of observation 108 is accordingly an expanded locus that is defined by the light rays 94,94*a*, 94*b* and further light rays that are anticipated to by-pass the proximity 109 of the vehicle marker 20. The generally streamlined shape of the display device 20 makes it possible to give it up to three times the size of some of the round shaped devices of the prior art without incurring drag penalties. This size will increase the amount of light rays intercepted and therefore the luminosity of the signal portions 95, 101 and 107 as well as the bright spot 104. In carrying out the disclosed method one would first determine the positions from which the vehicle marker would be most often viewed. In the shown case most often from the rear, but also from the front and the sides. It is certain that at given times these positions, the display device and light rays from a strong light source will be aligned. The second step of the method will entail positioning the light concentrators 93,100,103 and 106 in such a way with respect to display device 20 and the vehicle 13 that they face these anticipated light rays and that signal portions 95, 101 and 107 face the known positions or the expanded locus of observation 108. The final step of the method will result in the enhanced luminosity of signal portions 95, 101 or 107 or the appearance of bright spot 104 when device 20 is exposed to light rays 94,94*a* or 94*b*. The flexible streamlined rod 92 serves as connecting member to movably connect the various light concentrators 93,100, 103, and 106 on display device 20. The flange 91 serves also as force transmitting means to impart pulses of movement from a vehicle such as car 13 to vehicle marker 20. Even when parked intermittent wind forces will sway the display device 20 by bending rod 92. By this action the step of varying the the luminosity of the signal portions 95,101 and 107** is carried out by temporarily changing the alignment of the light rays, light concentrators and the signal portions. It is evident that the shown apparatus can be incorporated into other vehicle parts such as outside rear view mirrors, roof racks or the like.

Figure 6:
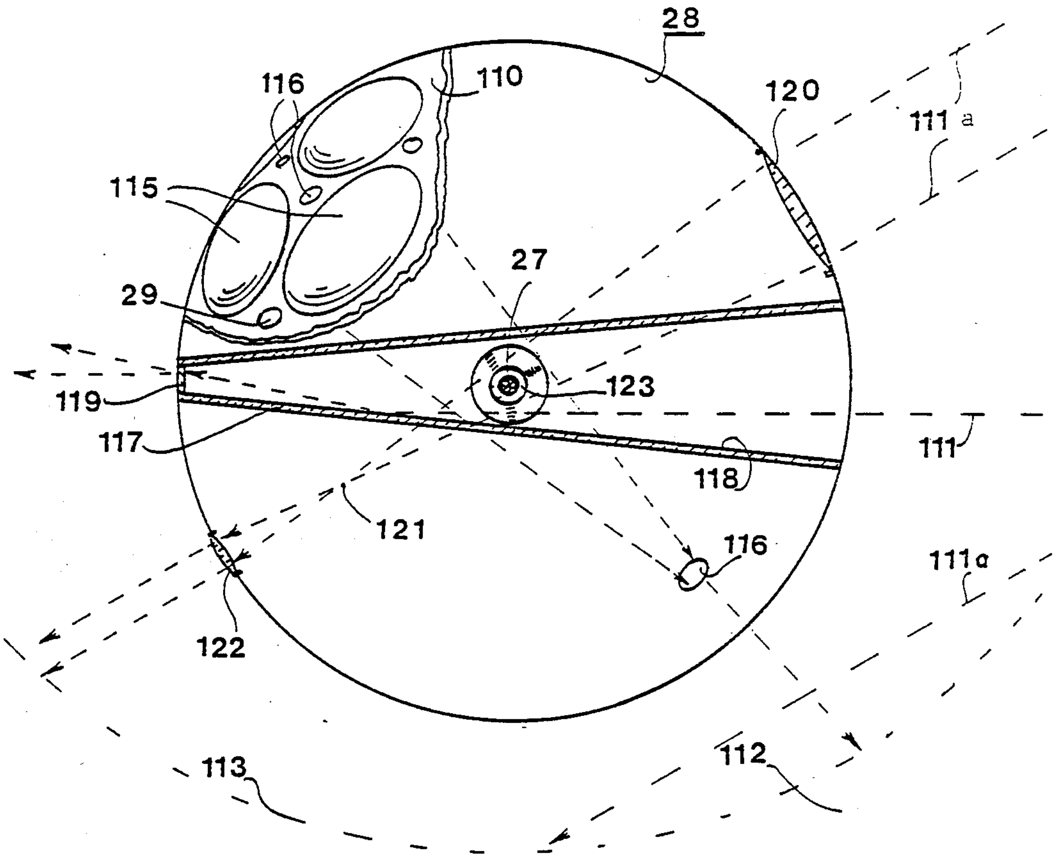
FIG. 6 is a partial sectional view of an obstacle marker.

FIG. 6 shows a partially sectional view of display device 28 that is an obstacle marker for power line 27 but that is designed to be used on any obstacle that is bound to be viewed from many angles in the same field of vision with an intense light source. The outer shell 110 is exposed to light rays 111, **111*a* and other light rays that are anticipated to by-pass the proximity 112 of shell 110 to define the locus 113 that is an expanded locus encompassing the entire space surrounding display device 28 to the limits of visibility. The shell 110 has provisions for light concentrators 115 and signal portions 116 one of which is bright spot 29 with enhanced luminosity. One of the light concentrators is reflector member 117 made from a transparent material. Some of light rays 111 are reflected from the glossy surface 118 of the funnel-shaped reflector 117 at a low angle of incidence and are converged toward the signal portion 119 where enhanced luminosity is created through light directing means including a transluscent material. The funnel shaped reflector 117 serves as internal brace for shell 110 but its transparent material permits light rays from further light concentrators 115 to converge toward further signal portions 116. These various structures are aligned to allow light rays to largely by-pass the powerline 27 inside shell 110. A further specially identified light concentrator is refractor or lens 120 having a selected focal length identified by focal point 121. A further lens is the collimating refractor 122 disposed as the light directing means and signal portion aligned from the light concentrator 120 at the distance defined by the sum of the focal length of lens 120 plus the focal length of lens 122. This arrangement makes possible the step of the method to render the light rays 111 a substantially parallel by refraction and direct them toward locus 113. A comparatively bright image of signal portion 120 is accordingly visible from a greater distance but through a narrower angle as compared to the transluscent signal portion 119. Light rays 111a are seen to converge toward signal portion 122 through the transparent material of component 117 at a high angle of incidence. Most of such material available to those skilled in the art have a transmission rate of better than 90% of most light wave lengths. The shell 110 can be be manufactured in fitted sections into which are inserted the various aligned light concentrators 115 and signal portions 116, or it can be assembled from components or members such as the reflector 117** that are adapted to form into a geodetic sphere such as the one illustrated. Powerlines masts, bridges and other high obstacles are hazards difficult to see from ships, airplanes and helicopters that are likely to approach them from any direction under conditions of glare. The obstacle marker 28 will provide a warning signal that will appear under glare as a darker sphere with at least one bright spot with enhanced luminosity. A movable connecting member or spring-suspended bearing 123 is part of the oscillating means that transmits impulses or naturally occurring oscillations that by means of the described method will give the signal portions 116 fluctuating brightness. This effect is also apparent when the observer moves at an angle to light rays 111 and sees one of the signal portions 116 first brighten and then dim.

Figure 7:
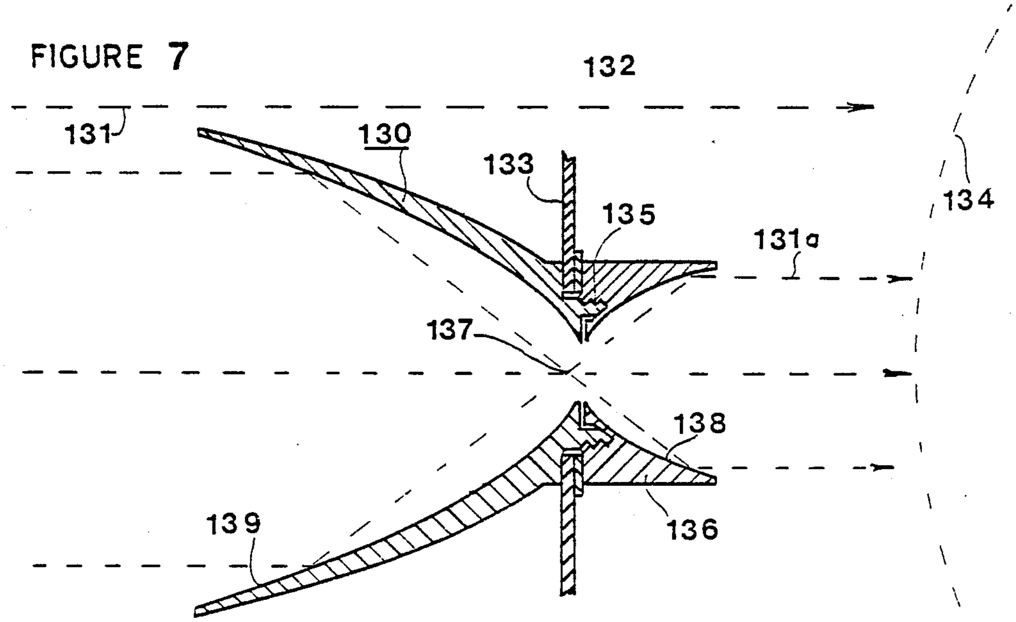
FIG. 7 is a sectional view of a component for a display device.

In FIG. 7 is illustrated in sectional view component or member 130 that has parabolic reflector 139 for use in combination with a display device. Light rays 131 by-pass the proximity 132 of display device 133 to define locus of observation 134 where glare will be apparent to an observer. A threaded portion 135 and fitting threaded female collar 136 are the attachment means to secure member 130 to display device 133 through prepared apertures. Optional spacers may be used as adjustment means to vary the alignment of member 130 with display device 133. Light rays 131 are converged by light concentrator 139 to focal point 137 which is also the focal point of parabolic collimating reflector 138. Collimator 138 faces the locus 134 and is part of the inside of collar or nut 136. The thread on both member or component 130 and collimator 138 permits adjustment to make their means distance equal to the sum of their combined mean focal length. Light rays 131*a* are accordingly directed in a substantially parallel bundle by light directing means 138 toward locus 134. Using the collimating reflector 138 makes possible the step of rendering light rays 131*a* substantially parallel by reflection and makes display device 133 visible from a greater distance. The brightness enhancing means consisting of light concentrator 139 and light directing means 138 can be made from reflective materials that are well known to those skilled in the art. Anodized aluminum or chromed plastic are among the possible choices. Ultimate selection of the specific materials suitable is left to those skilled in the art.

Figure 8:
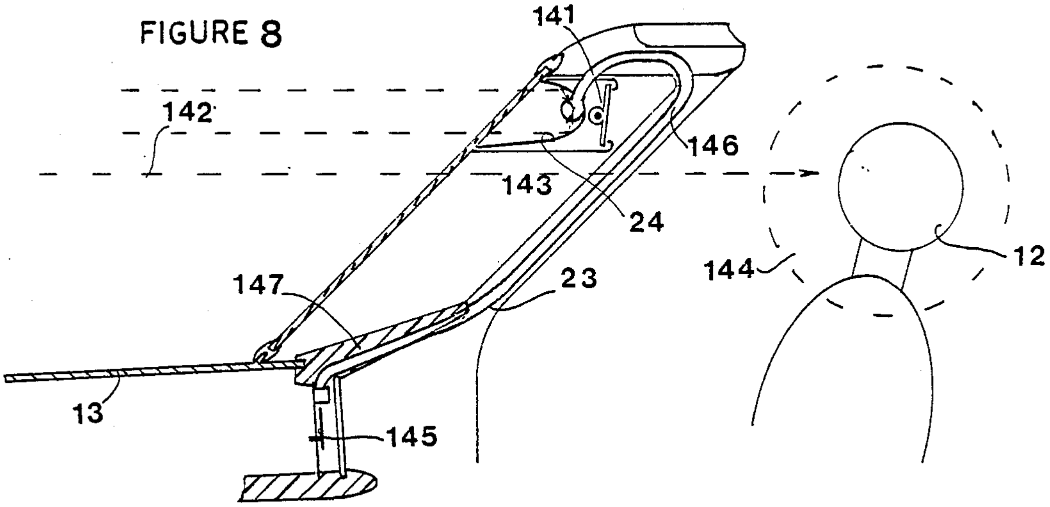
FIG. 8 is a schematic view of an instrument display device.

FIG. 8 shows a schematic presentation of display device 23 which is the instrumentation of vehicle in FIG. 1 but which also could represent the cockpit of an airplaine or bridge of a ship. Light concentrator 24 is seen to be incorporated in rearview mirror assembly 141 without further impeding the view of driver 12 who sees light rays 142 in his field of vision. Some of these light rays have by-passed the proximity 143 of display device 23 and define the locus 144 which encompasses the likely location of any drivers head. Light concentrator 24 is a parabolic reflector and linked to signal portion 145 by light conducting means 146 which is a fibre optics cable suitably adapted at both ends to receive and give off the light rays that it transmits. Fluorescent substances may be employed as the light directing means on the numerals and indicators of signal portion 145. Direct transmission of light rays between light concentrator 24 and signal portion 145 is made impractical by the intervening shading cover 147 that is an opaque obstacle for light rays 142. Optical fibers 146 are routed beneath the trim of vehicle 13 past obstacle 147 toward the signal portion 145 of the cars instrument panel. Whenever glare conditions bring this instrument panel into a deep shadow, the display device 23 will automatically enhance the luminosity of signal portion 145 by the method of transmitting light rays concentrated in light concentrator 24 via the light conducting means 145 past opaque obstacle 147. Other applications of this particular embodiment are obviously situations where traffic signs are installed against overpasses or where they are temporarily blocked from the direct sunlight such as near railway crossings when the passing train would shadow the traffic signal.

Figure 9:
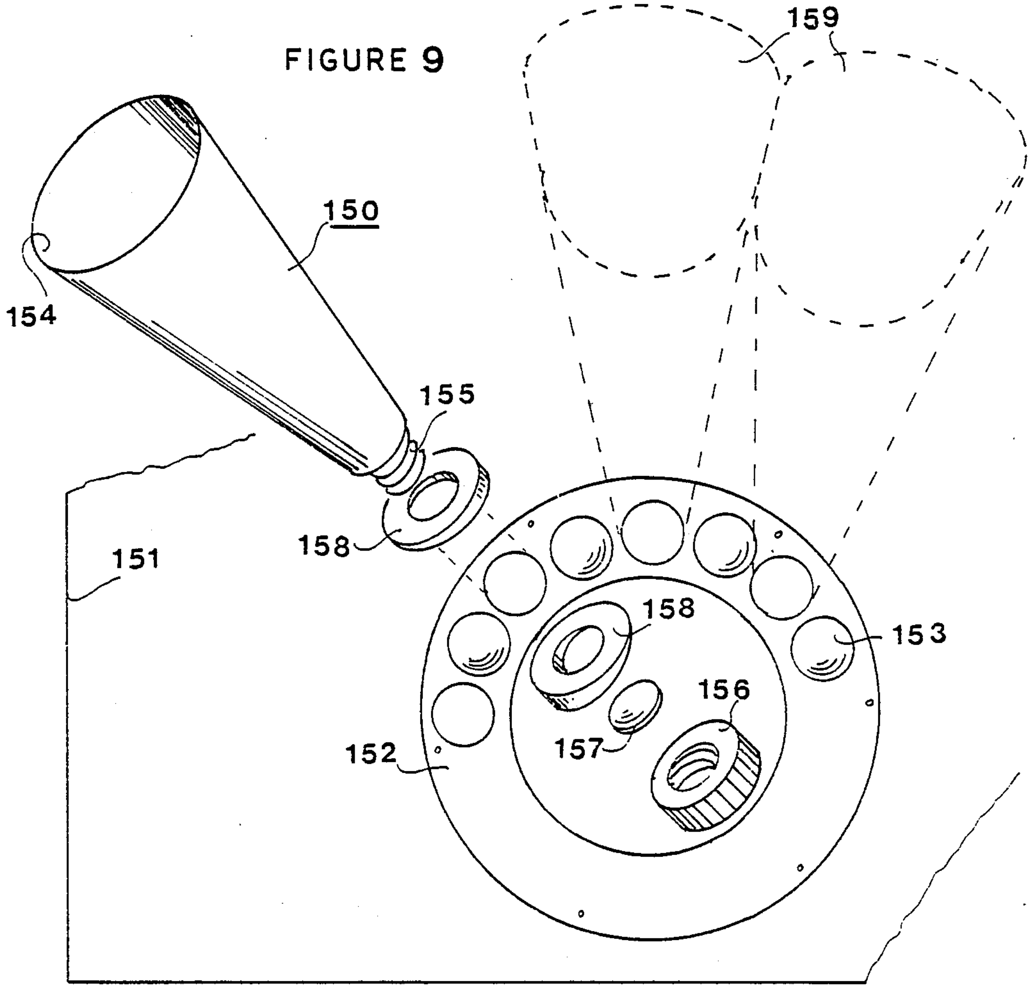
FIG. 9 is an exploded view of components on a display device.

FIG. 9 shows in perspective and exploded view a member or component 150 for use in combination with display device 151 with symbol 152 that has round reflectors 153 press-fitted into it. This design of reflective letters, symbols and border strips is used in part of the Interstate Highway System. Element 150 has a simple funnel shaped light concentrator 154 formed from a reflective sheet material such as aluminum or chromed plastic, that terminates in a roll-formed thread section 155 that is part of the attachment means and fits threaded collar 156. The collar 156 is adapted to secure also light directing means 157 which can be one of the previously described transluscent plugs, collimators or one of the dislodged reflective wafers 153 from which the opaque backing has been removed. Wedge-shaped washers 158 are the adjustment means that can be inserted between reflector 154, symbol 152 and threaded collar or nut 156, selectively rotated and aligned in such a way so as to set member 150 at a selected angle if glare-producing light rays strike display device 151 in a direction other than normal. Two further elements 159 are shown in phantom lines to illustrate the positioning and possible squashing of light concentrator 154 to give maximum collector area in curved symbols etc. This bending of the cone-shaped reflector 154 does not unduly impair or change the focal area that is ideally centered on light directing means 157. The touching sides of components 150 and 159 can be cemented together with a suitable glue to form a strong "honeycomb" structure. An optional transparent cover can be cemented into place to form a "honeycomb" sandwich making the display device 151 resistant to the stresses of snow removal and other dangers. Retrofitting existing highway sign 151 would require removing each second reflector 153 and using a portable hole cutter to cut a 7/8" hole through the main sheet of sign 151 and subsequently install component 150 aligned to the anticipated glaring light rays and its adjacent member 159.

The application of the disclosed method to produce automatically enhanced luminosity on display devices and the use of the preferred embodiments is not limited to the instances shown, but the present invention has the potential to improve the visibility of indicators in all glare conditions. The present invention shall therefore be considered defined not solely by the disclosed embodiments but by the following claims:

I claim:

1. A method to produce automatically increased luminosity of a bright signal portion disposed on a darker background surface of a display device when light rays coming from the direction of an intense and moving light source strike that display device and when said display device is viewed in the same field of vision with said light rays from a selected locus, said locus defined by those of said light rays that have by-passed or are anticipated to by-pass the proximity of said display device, said display device comprising at least one light concentrator adapted and aligned to converge some of said light rays toward said signal portion, said signal portion comprising light directing means adapted to direct some of said light rays toward said locus, said method comprising the step of:

(a) determining the position of said light source, the position of said display device and the position of said locus where said light rays, said display device and said locus are substantially aligned or where said display device and said light rays are in the same field of vision when viewed from said locus,
(b) aligning and positioning said display device in such a manner that said light concentrator faces substantially into the direction of said light rays and said signal portion faces substantially toward said locus and
(c) exposing said display device to said light rays, thereby causing said signal portion to have said increased luminosity by concentrating some of said light rays onto said signal portion and directing them toward said locus.

2. A method as defined in claim 1 wherein said light concentrator comprises a reflector and wherein said method comprises the step of concentrating said light rays onto said signal portion by reflection.

3. A method as defined in claim 1 wherein said light concentrator comprises a refractor and wherein said method comprises the step of concentrating said light rays onto said signal portion by refraction.

4. A method as defined in claim 1 wherein said light directing means of the signal portion comprises at least one transluscent member having selected optical properties, said transluscent member adapted and positioned to effect the passage of some of said light rays from said signal portion toward said locus and wherein said method comprises the step of passing some of said light rays through said transluscent member, thereby causing some of said light rays to be modified by said optical properties of said transluscent member and directing some of said light rays toward said locus.

5. A method as defined in claim 1 wherein said display device is not positioned normal to the direction of said light rays emanating from said light source toward said locus and wherein said display device comprises adjustment means adapted to adjust the alignment of said light concentrator with respect to said display device and wherein said method comprises the step of: aligning said light concentrator at a selected angle with respect to said display device in such a manner so as to guide some of said light rays through said light concentrator and said light directing means toward said locus.

6. A method as defined in claim 1 wherein said light concentrator is a pivotable light concentrator and wherein there is disposed on said display device tracking means adapted to track or adjust to the direction of said light rays and to move said pivotable light concentrator with suitable impulses through drive means linked to said pivotable light concentrator and wherein said method comprises the steps of:

(a) determining the direction of said light rays with said tracking means and
(b) aligning said pivotable light concentrator by the use of said drive means with the direction of said light rays.

7. A method as defined in claim 1 wherein said light directing means of the signal portion comprises at least one collimating reflector and wherein said method comprises the step of rendering said light rays directed toward said locus substantially parallel by reflection.

8. A method as defined in claim 1 wherein said light directing means of the signal portion comprises at least one collimating refractor and wherein said method comprises the step of rendering said light rays directed toward said locus substantially parallel by refraction.

9. A method as defined in claim 1 wherein said light concentrator and said signal portion are separated by an opaque obstacle and wherein said light concentrator and said signal portion are linked by light conducting means adapted to transmit some of said light rays and wherein said method comprises the step of conducting some of said light rays from said light concentrator via said light conducting means past said obstacle toward said signal portion.

10. A method as defined in claim 1 wherein said display device comprises oscillating means whereby the alignment of said light concentrator, said signal portion and said light rays can be temporarily changed and wherein said method comprises the step of: intermittently varying the luminosity of said signal portion by bringing a force to bear on said oscillating means in such a manner so as to temporarily change the alignment of said light concentrator, said signal portion and said light rays, thereby varying the amount of said light rays that strike said signal portion.

11. In a display device having a bright signal portion disposed on a darker background surface, said display device subject to being viewed at least part of the time from a selected locus and together in the same field of vision with light rays coming from the direction of an intense and moving light source, said locus defined by those of said light rays that are anticipated to by-pass the proximity of said display device, the improvement comprising brightness enhancing means adapted to automatically enhance or increase the luminosity of said signal portion when said locus, said display device and said light rays are substantially aligned or when said display device and said light rays are in the same field of vision when viewed from said locus, said brightness enhancing means comprising:

(a) at least one light concentrator having selected focal length disposed on said display device in such a manner so as to be facing into the direction of said light rays when said locus, said display device and said light rays are substantially aligned, said light concentrator adapted and positioned to converge some of said light rays toward said signal portion and
(b) light directing means disposed on said signal portion, said light directing means adapted to direct some of said light rays coming through said light concentrator toward said locus.

12. A display device as defined in claim 11 wherein said light concentrator comprises a reflector.

13. A display device as defined in claim 11 wherein said light concentrator comprises a refractor.

14. A display device as defined in claim 11 wherein said light directing means disposed on said signal portion comprises at least one transluscent member having selected optical properties and adapted and positioned on said signal portion in such a manner so as to effect the passage of some of said light rays coming from said light concentrator via said signal portion toward said locus.

15. A display device as defined in claim 11 wherein said display device is not positioned substantially normal to said direction of the light rays emanating from said light source toward said locus and wherein said display device comprises adjustment means adapted to adjust the alignment of said light concentrator with respect to said display device.

16. A display device as defined in claim 11 wherein said light concentrator is a pivotable light concentrator and wherein there is disposed on said display device tracking means adapted to track or adjust to the direction of said light rays and to selectively pivot said pivotable light concentrator to be aligned with said light rays, said tracking means comprising:

(a) sensing means adapted to determine the direction of said light rays and to generate and deliver impulses suitable to selectively pivot or align said pivotable light concentrator with said light rays and (b) driven means adapted to move said pivotable light concentrator into alignment with said light rays according to the impulses received from said sensing means.

17. A display device as defined in claim 11 wherein said locus is an expanded locus that is additionally defined by further light rays that are anticipated to by-pass the proximity of said display device from a further direction and wherein said display device comprises a further light concentrator with a selected focal length disposed on said display device at a selected angle to said light concentrator, said further light concentrator aligned on said display device to face said further light rays and wherein said display device comprise a further signal portion positioned to face said expanded locus and to receive some of said further light rays converging from said further light concentrator.

18. A display device as defined in claim 17 wherein said light concentrator is a reflector made from a transparent material that is provided with a smooth surface adapted to reflect some of said light rays at a low angle of incidence toward said signal portion, said reflector made from said transparent material disposed on said display device in such a manner so as to allow some of said further light rays converging from said further light concentrator toward said further signal portion to travers or go through said transparent material.

19. A display device as defined in claim 11 wherein said light directing means comprises a collimating refractor having a selected focal shorter than said focal length of said light concentrator, said collimating refractor having a smaller area than said light concentrator, said collimating refractor disposed on said display device at a selected distance from said light concentrator, said distance substantially defined by the sum of the said focal length of the light concentrator plus the said focal length of the collimating refractor.

20. A display device as defined in claim 11 wherein said light directing means comprises a collimating reflector having selected focal length shorter than said focal length of said light concentrator, said collimating reflector having a smaller area than said light concentrator, said collimating reflector disposed on said display device at a selected distance from said light concentrator, said distance substantially defined by the sum of the said focal length of the light concentrator plus the said focal length of the collimating reflector.

21. A display device as defined in claim 11 wherein said light rays travelling in the direction toward said signal portion are blocked by an opaque obstacle and wherein said light concentrator facing into the direction of said light rays is connected to said signal portion by light conducting means adapted to transmit some of said light rays from said light concentrator past said obstacle toward said signal portion.

22. A display device as defined in claim 11 wherein there are disposed on said display device oscillating means adapted to temporarily change the alignment between said light concentrator, said signal portion and said light rays, thereby causing the luminosity of said signal portion to fluctuate, said oscillating means comprising:

(a) a connecting member adapted to movably connect said light concentrator or said light directing means on said display device and (b) a force transmitting means adapted to impart pulses of force, said force transmitting means disposed on said display device in such a manner so as to be able to temporarily change the alignment of said light concentrator, said light directing means and said light rays by by the use of said connecting member.

23. A member or component for use in combination with a signal portion of a display device, said member comprising brightness enhancing means adapted to automatically enhance the luminosity of an intense movable when light rays coming from the direction of an intense movable light source strike said display device at a selected angle, said brightness enhancing means comprising:

(a) attachment means adapted to attach said member at said selected angle to said display device, (b) a light concentrator adapted to intercept some of said light rays coming from said light source and to concentrate some of said light rays toward a selected focal area and (c) light directing means disposed on said member substantially at said focal area, said light directing means adapted to be part of said signal portion and to send some of said light rays intercepted by said light concentrator to continue on substantially in the direction of said selected angle.

* * * * *

UNITED STATES PATENT AND TRADEMARK OFFICE
CERTIFICATE OF CORRECTION

PATENT NO. : 4,846,549

DATED : July 11, 1989

INVENTOR(S) : Gunter E. Gutsche

It is certified that error appears in the above-identified patent and that said Letters Patent is hereby corrected as shown below:

Column 4, line 25, change "2" to --25--

Column 6, line 19 change "concentrator" to --concentrators--

Column 8, line 14, insert a "," after --parked--

Column 8, line 33, insert a "," after --116--

Column 8, line 55, change "111 a" to --111a--

Column 9, line 2, insert a "," after --Powerlines--

Column 9, line 33, change "means" to --mean--

Column 13, line 19, change "driven" to --drive--

Column 13, line 32 change "comprise" to --comprises--

Column 14, lines 39 & 40 change " an intense movable" to --said signal portion--

Signed and Sealed this

Twenty-second Day of May, 1990

*Attest:*

HARRY F. MANBECK, JR.

*Attesting Officer* *Commissioner of Patents and Trademarks*